United States Patent
Stam et al.

(10) Patent No.: US 8,045,760 B2
(45) Date of Patent: *Oct. 25, 2011

(54) AUTOMATIC VEHICLE EXTERIOR LIGHT CONTROL SYSTEMS

(75) Inventors: Joseph S. Stam, Holland, MI (US); Eric J. Walstra, Grand Rapids, MI (US); Keith H. Berends, Hudsonville, MI (US); Brock R. Rycenga, Wyoming, MI (US); Kevin J. Longworth, Fruitport, MI (US); David A. Meekhof, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 1034 days.

This patent is subject to a terminal disclaimer.

(21) Appl. No.: 10/777,468

(22) Filed: Feb. 12, 2004

(65) Prior Publication Data

US 2004/0201483 A1 Oct. 14, 2004

Related U.S. Application Data

(60) Provisional application No. 60/448,793, filed on Feb. 21, 2003.

(51) Int. Cl.
*G06K 9/00* (2006.01)
*B60Q 1/00* (2006.01)
*B60Q 1/26* (2006.01)
*F21V 21/28* (2006.01)

(52) U.S. Cl. .............. 382/104; 340/457.2; 340/468; 362/465; 362/466

(58) Field of Classification Search .......... 382/104, 382/156–162; 362/465, 466; 340/461, 601, 340/600; 250/208.1

See application file for complete search history.

(56) References Cited

U.S. PATENT DOCUMENTS

| | | | |
|---|---|---|---|
| 2,632,040 A | 3/1953 | Rabinow |
| 2,827,594 A | 3/1958 | Rabinow |
| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagami et al. |
| 4,599,544 A | 7/1986 | Martin |
| 4,665,321 A | 5/1987 | Chang et al. |
| 4,692,798 A | 9/1987 | Seko et al. |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |

(Continued)

FOREIGN PATENT DOCUMENTS

CH 505715 5/1971

(Continued)

OTHER PUBLICATIONS

Kuno et al, "Detection of Road Conditions with CCD Cameras Mounted Vehicle", Systems and Computers in Japan, vol. 30, No. 14, 1999.*

(Continued)

*Primary Examiner* — Gregory M Desire
*Assistant Examiner* — Andrae S Allison
(74) *Attorney, Agent, or Firm* — Price Heneveld LLP

(57) ABSTRACT

The present invention relates to various improvements relating to automatic vehicle equipment control systems.

18 Claims, 8 Drawing Sheets

U.S. PATENT DOCUMENTS

| | | | |
|---|---|---|---|
| 4,967,319 A | 10/1990 | Seko | |
| 5,036,437 A | 7/1991 | Macks | |
| 5,072,154 A | 12/1991 | Chen | |
| 5,086,253 A | 2/1992 | Lawler | |
| 5,124,549 A | 6/1992 | Michaels et al. | |
| 5,182,502 A | 1/1993 | Slotkowski et al. | |
| 5,187,383 A | 2/1993 | Taccetta et al. | |
| 5,235,178 A | 8/1993 | Hegyi | |
| 5,329,206 A | 7/1994 | Slotkowski et al. | |
| 5,416,318 A | 5/1995 | Hegyi | |
| 5,426,294 A | 6/1995 | Kobayashi et al. | |
| 5,434,407 A | 7/1995 | Bauer et al. | |
| 5,451,822 A | 9/1995 | Bechtel et al. | |
| 5,471,515 A | 11/1995 | Fosum et al. | |
| 5,508,592 A | 4/1996 | Lapatovich et al. | |
| 5,537,003 A | 7/1996 | Bechtel et al. | |
| 5,550,677 A | 8/1996 | Schofield et al. | |
| 5,562,336 A * | 10/1996 | Gotou | 362/466 |
| 5,614,788 A | 3/1997 | Mullins et al. | |
| 5,660,454 A | 8/1997 | Mori et al. | |
| 5,666,028 A | 9/1997 | Bechtel et al. | |
| 5,715,093 A | 2/1998 | Schierbeek et al. | |
| 5,781,105 A * | 7/1998 | Bitar et al. | 340/468 |
| 5,796,094 A | 8/1998 | Schofield et al. | |
| 5,798,911 A * | 8/1998 | Josic | 362/466 |
| 5,811,888 A | 9/1998 | Hsieh | |
| 5,812,321 A | 9/1998 | Schierbeek et al. | |
| 5,837,994 A | 11/1998 | Stam et al. | |
| 5,841,126 A | 11/1998 | Fossum et al. | |
| 5,912,534 A | 6/1999 | Benedict | |
| 5,923,027 A | 7/1999 | Stam et al. | |
| 5,942,853 A | 8/1999 | Piscart | |
| 5,963,148 A * | 10/1999 | Sekine et al. | 340/905 |
| 5,990,469 A | 11/1999 | Bechtel et al. | |
| 6,008,486 A | 12/1999 | Stam et al. | |
| 6,049,171 A | 4/2000 | Stam et al. | |
| 6,097,023 A | 8/2000 | Schofield et al. | |
| 6,130,421 A | 10/2000 | Bechtel et al. | |
| 6,144,158 A | 11/2000 | Beam | |
| 6,254,259 B1 * | 7/2001 | Kobayashi | 362/465 |
| 6,396,397 B1 | 5/2002 | Bos et al. | |
| 6,429,594 B1 | 8/2002 | Stam et al. | |
| 6,556,435 B1 * | 4/2003 | Helot et al. | 361/686 |
| 7,004,606 B2 * | 2/2006 | Schofield | 362/460 |
| 2002/0040962 A1 | 4/2002 | Schofield et al. | |

FOREIGN PATENT DOCUMENTS

| | | | |
|---|---|---|---|
| DE | 2946561 | | 5/1981 |
| FR | 2641237 | | 7/1990 |
| FR | 2726144 | | 4/1996 |
| JP | 01281496 | * | 5/1988 |
| JP | 8-166221 | | 6/1996 |
| WO | 8605147 | | 9/1986 |
| WO | 9735743 | | 10/1997 |
| WO | 9843850 | | 10/1998 |
| WO | 9947396 | | 9/1999 |
| WO | 0022881 | | 4/2000 |
| WO | WO 01/70538 A2 | | 9/2001 |

OTHER PUBLICATIONS

Simpson et al, "A Recurrent Neural Network Classifier for Improved Retrievals of Areal Extent of Snow Cover", IEEE Transactions on Geoscience and Remote Sensing, vol. 39, No. 10, Oct. 2001.*

Kher et al, "A Novel Fuzzy Control of the Intensity of Head lights for Night Driving", Proceedings of the IEEE Intelligent Vehicles Symposium 2000 Dearborn (MI), USA Oct. 3-5, 2000.*

* cited by examiner

AUTOMATIC VEHICLE EXTERIOR LIGHT CONTROL SYSTEMS

CROSS REFERENCE TO RELATED APPLICATIONS

The present application claims priority, under 35 U.S.C. §119(e), to U.S. provisional patent application serial No. 60/448,793, filed on Feb. 21, 2003. The disclosure of this provisional patent application is incorporated herein in its entirety by reference.

BACKGROUND OF THE INVENTION

Automatic vehicle exterior light control systems provide a significant convenience function for drivers by alleviating the burden of manually switching between high and low beam headlights in response to changing traffic conditions. It is known that drivers, on average, do not utilize their high beam headlights as often as is appropriate. High beam headlights can provide from two to four, or more, times the visibility distance at night as compared to low beam headlights. Thereby, a driver of a controlled vehicle is enabled to detect an obstacle or pedestrian at night earlier than otherwise would be the case. There is a safety benefit during night time driving introduced by automating the beam switching task and increasing the average utilization of high beam headlights.

Known systems designed to automatically control vehicle exterior lights utilize a forward looking digital imaging system to acquire images of the scene generally in front of the controlled vehicle, to analyze the images and to detect headlights of oncoming vehicles and taillights of leading vehicles. If ambient lighting conditions are low enough to warrant high beam headlight usage and no oncoming or leading vehicles are detected, high beam headlights are automatically activated. When other traffic is detected within the range where drivers of the other vehicles would experience glare induced by the high beam headlights of the controlled vehicle, the high beam headlights of the controlled vehicle are automatically reduced in intensity, the aim redirected, inhibited from operation or a combination thereof. In addition, or as an alternative, to controlling high beam headlights, automatic vehicle exterior control systems may be adapted to control a variety of lighting technologies, including the intensity of at least one low beam headlight, the aim of at least one low beam headlight, bending light, motorway lighting, town lighting, fog light, taillight or any other vehicle illumination device. It should be understood that wherein the disclosure below specifically mentions the control of high beam headlights, or the inhibiting of automatic high beam headlight control, those methods may be also applied to the control of a variety of exterior lighting technologies including, but not limited to, those listed above.

A problem with known systems occurs at various times when, due to a variety of factors, high beam headlight operation is not desired even when there are no oncoming or leading vehicles. Examples of such situations include poor weather such as fog, a snow storm or when the light from high beam headlights of the controlled vehicle reflects off of atmospheric conditions of interest and distracts the driver of the controlled vehicle. Certain atmospheric conditions also attenuate light rays coming from other vehicles making it more difficult for an imaging system to detect them at sufficient distance. Another condition when high beam headlights are generally not desired is when driving in towns. In some European countries high beam headlight use is prohibited in towns, even if there are no oncoming or leading vehicles.

Another problem associated with use of an imaging system to automatically control vehicle exterior lights occurs when the view of the associated image sensor may be blocked or obstructed by objects or contamination in front of the image sensor. Preferably, the imaging system is integrated into the rearview mirror assembly of the controlled vehicle such that the image sensor is positioned behind the windshield in a region where the associated windshield wipers clean. However, even in this configuration, the possibility exists that ice or other contaminates cannot be removed by the wipers and will still block the image sensor. In these cases, the image sensor may not be able to sense the lights from oncoming or leading vehicles and the system will incorrectly conclude that there are no vehicles present and activate the high beam headlights, causing glare to drivers of other vehicles. These situations require the driver of the controlled vehicle to intervene and switch the automatic system off which may lead to dissatisfaction with the automatic feature and reduced confidence in the automatic vehicle exterior light control system. Thus, it is advantageous to automatically detect situations where the automatic high beam control system cannot perform satisfactorily and automatically disable the feature and revert to a fail-safe low beam condition. In these situations manual control is typically still provided allowing the driver to determine the desired exterior light state when the automatic system is unable to perform.

What are needed are automatic vehicle exterior light control systems that provide improved features to detect related operational environments. Systems configured to automatically respond to detected operational environments are also needed.

SUMMARY OF THE INVENTION

The present invention provides automatic vehicle exterior light control systems that provide improved features to detect related operational environments. Systems configured to automatically respond to detected operational environments are also provided.

In at least one embodiment, automatic vehicle exterior light control systems are provided with improved ambient lighting detection features. In related embodiments, systems are provided that automatically control various vehicular systems in response to the detected ambient light.

In at least one embodiment, automatic vehicle exterior light control systems are provided with improved atmospheric condition of interest detection features. In related embodiments, systems are provided that automatically control various vehicular systems in response to the detected atmospheric conditions of interest.

In at least one embodiment, automatic vehicle exterior light control systems are provided with improved imager blockage and, or, faulty imager detection features. In related embodiments, systems are provided that automatically control various vehicular systems in response to the detected imager blockage and, or, faulty imager.

In at least one embodiment, automatic vehicle exterior light control systems are provided with improved "town" operation detection features. In related embodiments, systems are provided that automatically control various vehicular systems in response to the detected town operation.

In at least one embodiment, automatic vehicle exterior light control systems are provided with improved pedestrian and, or, bicyclist detection features. In related embodiments, systems are provided that control various vehicular systems in response to the detected pedestrian and, or, bicyclist.

In at least one embodiment, various improvements of the present invention are integrated with other vehicular systems. In at least one related embodiment, the various integrated systems are configured to share components for improved operation and, or, to lower associated costs.

Other advantages of the present invention will become apparent when reading the following detail description in light of the figures, examples and appended claims.

DETAILED DESCRIPTION OF THE INVENTION

Figure 1:
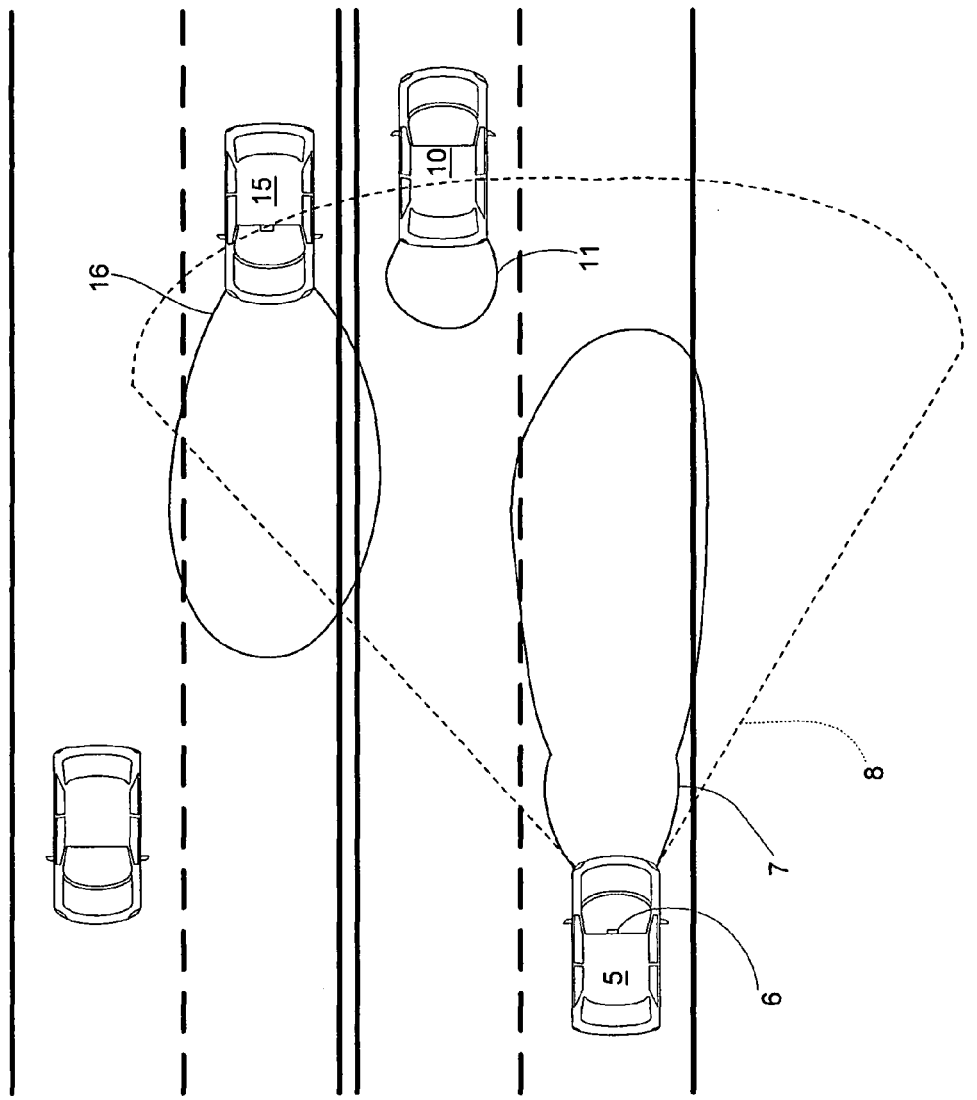
FIG. 1 depicts a controlled vehicle relative to the taillights of a leading vehicle and the headlights of an oncoming vehicle.

Referring initially to FIG. 1, for illustrative purposes, an automatic vehicle exterior light control system 5 is shown to be installed within a controlled vehicle 10. Although the control system 5 is depicted to be integral with the interior rearview mirror assembly, it should be understood that the control system, or any of the individual components thereof, may be mounted in any suitable location within or on the controlled vehicle 10. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 10 and allow for detection of headlights 21 of oncoming vehicles 20 and taillights 16 of leading vehicles 15 within the glare zone 25 associated with the controlled vehicle.

Figure 2:
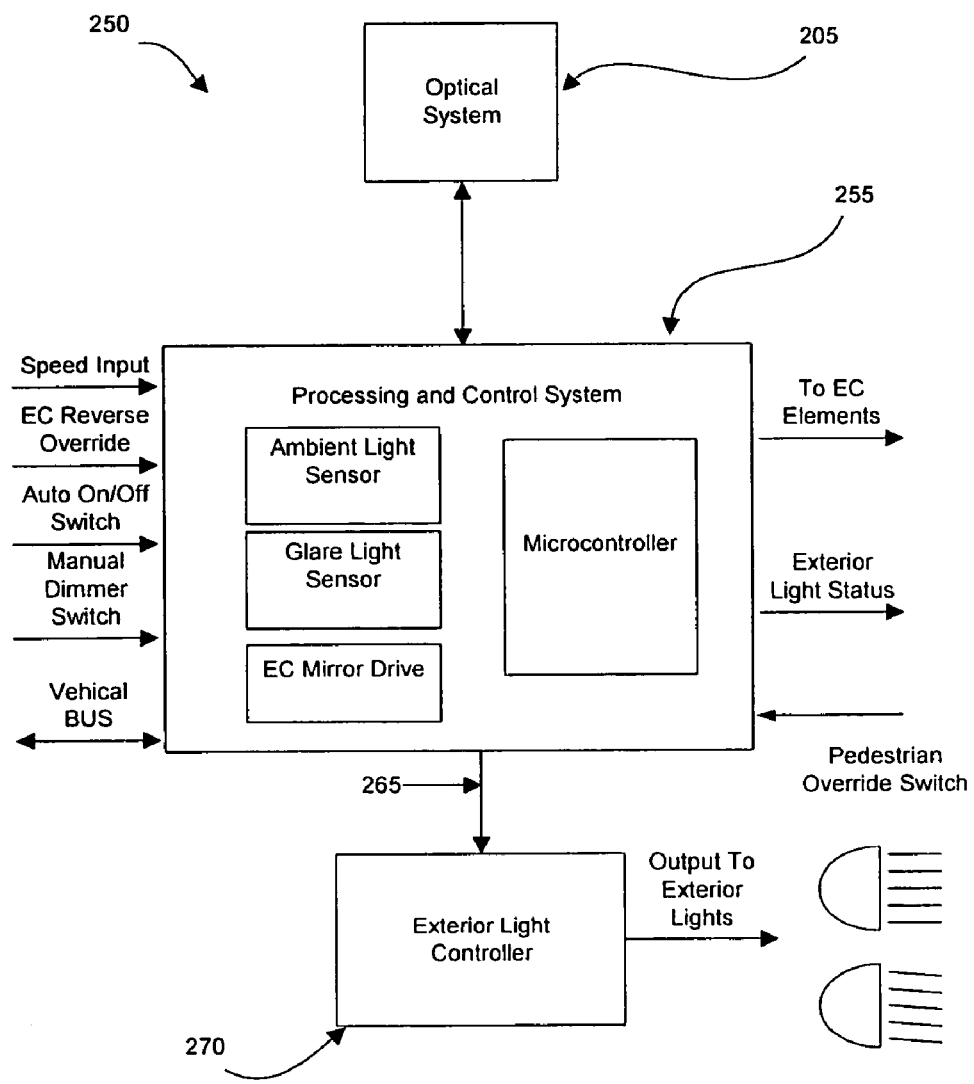
FIG. 2 depicts a block diagram of an exterior light control system.

FIG. 2 depicts a block diagram of an automatic vehicle exterior light control system 250 employing an optical system 205 and a processing and control system 255 in communication with an exterior light controller 270 via interconnection 265. The processing and control system functions to send configuration data to the optical system, receive image data from the optical system and to process the images as described in detail herein and to generate exterior light control signals. Detailed descriptions of automatic vehicle exterior light control systems and algorithms that may be at least partially integrated in various embodiments of the present invention are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235,476 and 09/800,460; the disclosures of which are incorporated herein in their entireties by reference. It should be understood that the block diagram of FIG. 2 is generally for illustrative purposes and that a suitable automatic vehicle exterior light control system, such as any of those disclosed in the patents and patent applications incorporated herein by reference, may be integrated.

Figure 3:
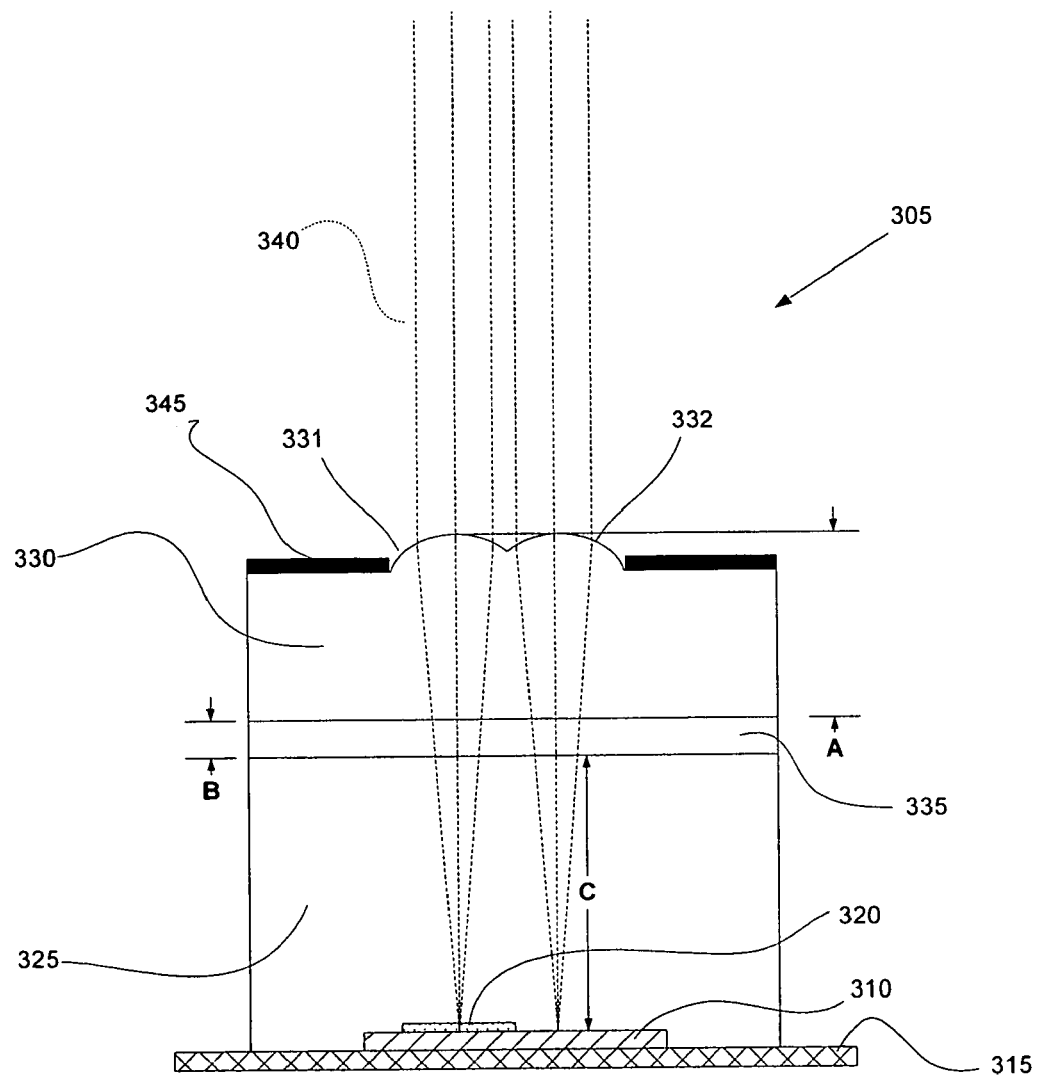
FIG. 3 depicts a section view of an optical system.

Turning now to FIG. 3, there is shown an optical system 305 for use with the present invention. In the optical system 305 shown in FIG. 3, an image sensor 310 is mounted on a printed circuit board 315. A spectral filter material 320, such as a red spectral filter, is positioned proximate the image sensor such that at least a portion of the associated pixels are spectrally filtered. Encapsulate block 325 is preferably molded over the image sensor such that a portion of the encapsulate block adheres to the circuit board. A lens assembly 330 is attached to the encapsulate block 325 via UV curable material adhesive 335. The lens assembly 330 comprises a first lens 331 that functions to project light rays 340 emanating from light sources within an associated scene onto the spectrally filtered portion of the image array. It should be understood that the term light sources, as used in portions of this detail description involves reflectors that reflect light rays. The lens assembly 330 comprises a second lens 332 that functions to project light rays 340 emanating from substantially the same scene associated with the first lens onto a separate portion of the image array. As will be described in more detail herein, there are certain embodiments where there are advantages associated with having two different spectrally filtered images of substantially the same scene. For example, a "red light-to-white light" ratio may be incorporated. Aperture stop 345 is positioned proximate the first and second lenses to inhibit light rays beyond the desired field of view from being projected upon the image sensor. It should be understood that the optical system depicted in FIG. 3 is shown for illustrative purposes and that any suitable optical system, such as any of those depicted and described in commonly assigned U.S. Pat. Nos. 5,990,469; 6,008,486; 6,130,421; 6,130,448; 6,049,171; and 6,403,942 and U.S. Provisional Patent Application 60/448,793 and 60/495,906; the disclosures of which are incorporated herein in their entireties by reference; may be employed.

As described in detail herein, in at least one embodiment an automatic vehicle exterior light control system is adapted to detect atmospheric conditions of interest such as fog, sleet, hail, smoke, steam, snow and rain. A number of algorithms and methods are disclosed herein for detection of atmospheric conditions of interest along with a host of desirable system responses.

In at least one embodiment, an automatic vehicle exterior light control system is adapted to detect a blocked image sensor condition. At least some of the methods disclosed herein for detecting a blocked image sensor are also applicable to detecting a faulty image sensor or system. Appropriate system responses are disclosed resulting from a blocked or faulty image sensor.

An automatic vehicle exterior light control system of at least one embodiment is adapted to detect ambient light levels and effectuate exterior light control according thereto. A number of exterior light operating parameters may be dependent upon an ambient light signal.

In yet another embodiment, an automatic vehicle exterior light control is adapted to control exterior lights dependent upon the location of the controlled vehicle. Certain countries and locals require that given exterior lights of a vehicle are not operated in locations such as metropolitan areas and within cities and towns. At least one automatic vehicle exterior light control system in accordance with the present invention is configured to automatically inhibit automatic operation of at least one exterior light accordingly.

Many countries have traffic regulations that prohibit operation of certain vehicle exterior lights when a pedestrian or cyclist would be subjected to glare due to the given exterior light. An automatic vehicle exterior light control system in one embodiment is configured to inhibit automatic operation of a given exterior light that would cause glare to pedestrians and cyclists. Another related embodiment alarms the driver of pedestrians and cyclists via an audible and, or, visual annunciator and relies upon the driver to manually insure the exterior light state is selected.

In known automatic vehicle exterior light control systems, measurement of an ambient light level for system enabling has been attempted. One such system uses a sky sensor optically directed generally upward of the controlled vehicle. Significant manufacturing issues exist related to incorporating a sky sensor on a printed circuit board with an image sensor. Prior art automatic vehicle exterior light control systems that employed forward looking ambient light sensors were subject to unstable operation. Depending on the direction the controlled vehicle was traveling, light rays from a setting, or rising, sun may impact the sensed ambient light level and cause oscillations in the system when the direction of travel changed. Other problems associated with known forward looking ambient light sensor based systems are associated with oncoming vehicle headlights, roadway lighting shadows or overpasses and the like. Similar oscillations or system instability may occur in either scenarios.

Due to the lower ambient light levels at which it is desirable to enable an automatic vehicle exterior light control system, use of the ambient sensor and, or, glare sensor incorporated in rearview mirrors for electrochromic element control is appealing. Such ambient sensors, glare sensors and rearview mirror controls are disclosed in commonly assigned U.S. Pat. Nos. 6,313,457, 6,359,274, 6,379,013, 6,402,328, 6,469,291 and U.S. patent application Ser. Nos. 10/043,977 and 10/068,540 the disclosures of which are incorporated in their entireties herein by reference.

In at least one embodiment of the present invention, an "inverted peak" detection algorithm is used to establish the ambient light level with which to enable the automatic vehicle exterior light control system. In known systems, a typical ambient light peak detector that detects and holds a peak of a signal, is employed. The ambient control devise of the present invention employs an inverse of the peak ambient method. The minimum values of the ambient light are of particular interest with the algorithms disclosed herein. When the ambient light level is particularly low, approximately 1 Lux or less, there are many scenarios that give false high readings, such as headlights of oncoming vehicles, AC street lights, the setting sun, the rising sun, roadside sign lighting, etc. However, there are not many situations that induce false low ambient light readings. The lowest ambient light readings are generally more representative of the actual ambient light.

In one embodiment of the present invention, the algorithms are implemented using a filtered ambient value that counts down quickly when the raw ambient light level signal is less than the then current filtered ambient value and counts up very slowly if the raw ambient light signal is higher than the then current filtered value.

A preferred threshold ambient light level associated with the filtered ambient light sensor signal used to enable the automatic vehicle exterior light control system is approximately 0.5 Lux. However, it should be understood that higher or lower threshold values may be used in accordance with the present invention, such as 0.25-1.5 Lux.

The time to enable the automatic vehicle exterior light control system preferably varies with respect to the actual ambient light level. If the filtered ambient light value is close to the threshold, preferably, it will take about a mile of driving to enable the automatic vehicle exterior light control system. If the filtered value is 2 or 4 times lower than the threshold, the automatic vehicle exterior light control system will preferably be enabled sooner. Different enablement rates are due to the fact that it is possible, no matter how the raw ambient light signal is filtered, to get ambient lighting conditions that are high for a long time and distance due to oncoming vehicle headlights, roadway lighting or the like. Therefore, the preferred method is designed to enable the automatic vehicle exterior light control system within a fraction of a mile if the ambient light was very low following a very bright area. If the ambient light increases above a hysteresis range of approximately 2 Lux, the filtered value would take several minutes to get above the threshold. In such an environment, the controlled vehicle would travel a couple of miles with the sensed ambient light value above 2 Lux before the filtered ambient light level would exceed the threshold value. Preferably, there is hysteresis in time and, or, distance to enable and, or, disable the automatic vehicle exterior light control system as a function of the ambient sensor signal.

Figure 4A:
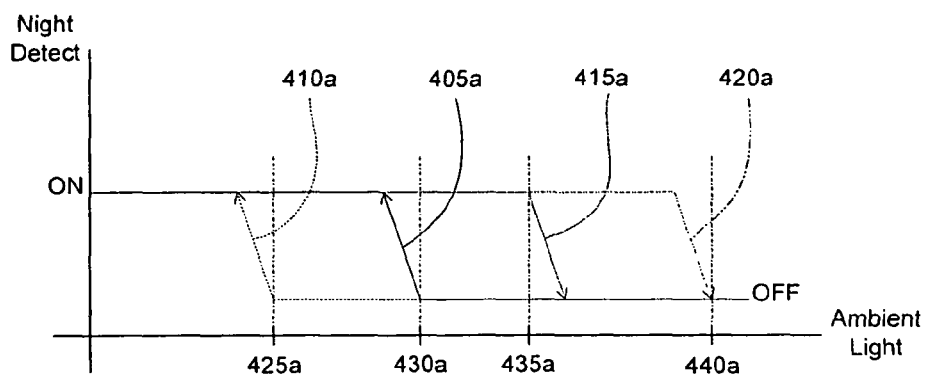
FIG. 4a depicts a plot of a night detect algorithm.
Figure 4B:
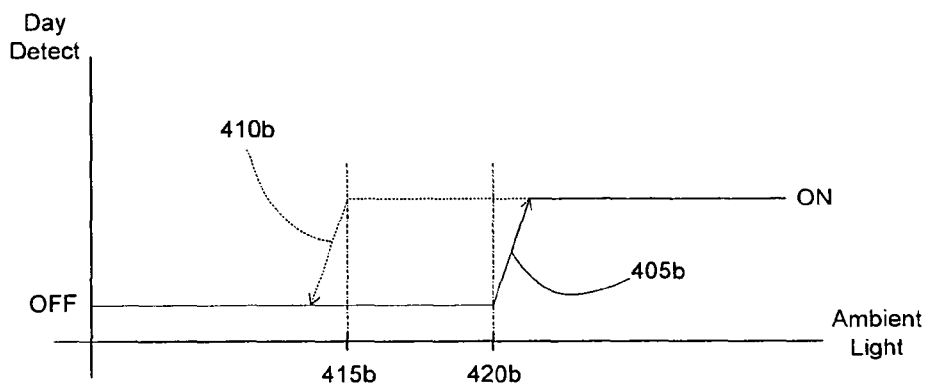
FIG. 4b depicts a plot of a day detect algorithm.

Turning now to FIGS. 4a and 4b there are shown plots representative of night detect and day detect algorithms, respectively, in accordance with the present invention. In at least one embodiment, a night detect algorithm is employed to enable automatic vehicle exterior light control. Preferably, a raw ambient light value is acquired from a corresponding photo sensor at intervals ranging from approximately 75 ms to approximately 125 ms and most preferably at intervals of 100 ms. The raw ambient light value may then be used to calculate an ambient short average value, an ambient average value, an ambient long average value or a combination thereof. Preferably, the ambient short average value is a weighted average of the most recent sixteen ambient sensor readings; with 100 ms intervals, this translates to 1.6 seconds. Preferably, the ambient long average is an exponential time weighted average of the most recent two hundred fifty-six ambient sensor readings; with 100 ms intervals, this translates to 25.6 seconds. With further reference to FIG. 4a, the transition 405a from night detect off to night detect on at night detect medium 430a preferably begins at a value between approximately 0.125 Lux and approximately 2 Lux and most preferably approximately 0.5 Lux. The transition 415a from night detect on to night detect off at night detect high 435a preferably begins at a value between approximately 0.5 Lux and approximately 88 Lux and most preferably approximately 2.0 Lux. Preferably, the transition 405a is relative the ambient long average value with a night detect off delay counter reset to approximately zero seconds. Preferably, the transition 415a is relative the ambient long average value with a delay of approximately 150 seconds. Alternatively, a transition 410a from night detect off to night detect on at night detect low 425a preferably begins at a value between approximately 0.0 Lux and approximately 0.5 Lux and most preferably approximately 0.125 Lux. Preferably, the transition 410a is relative the ambient short average value. Alternatively, a transition 420a from night detect on to night detect off at day detect on 440a ends at between approximately 2 Lux and approximately 100 Lux and most preferably 88 Lux. Preferably, the transition 420a is relative the ambient long average value.

With further reference to FIG. 4b, the transition 405b from day detect off to day detect on preferably day detect on 420b begins at between approximately 44 Lux and approximately 100 Lux and most preferably at approximately 88 Lux. Preferably, the transition 405b is relative the ambient long average value. The transition 410b from day detect on to day detect off preferably day detect off 415b begins at between approximately 0.0 Lux and approximately 88 Lux and most preferably approximately 44 Lux. Preferably, the transition 405b is relative the ambient long average value.

Use of the night detect algorithm is particularly useful for enabling and disabling automatic vehicle exterior light control. Use of the day detect algorithm is particularly useful for enabling and disabling automatic control of an electrochromic mirror. These algorithms are advantageously employed to account for variations in ambient lighting due to the effects of sun light, street lighting, parking lot lighting, building lighting, moon light, shadows from trees, shadows from bridges, shadows from tunnels, and the transitions from one ambient lighting condition to another. It should be understood that these algorithms may be employed in other vehicular systems, such as, moisture sensing, vision systems, display intensity control, etc.

In accordance with at least one embodiment of the present invention an automatic vehicle exterior light control system, as discussed above with reference to FIG. 2 and as disclosed in the above incorporated patents and patent applications, is adapted to detect the presence of atmospheric conditions that result in light rays emanating from an exterior light of the controlled vehicle being reflected. Examples of such atmospheric conditions include, but are not limited to, fog, mist, snow, sleet, hail, rain, steam, smoke, dust and combinations thereof. As used herein, the term "atmospheric condition" will be used to refer to any atmospherically suspended substance that reflects and or scatters light rays. The sensitivity required to detect the reflection of an exterior light of a controlled vehicle off of atmospheric conditions of interest is typically higher than the sensitivity needed for detection of the taillights of leading vehicles and headlights of oncoming vehicles.

Certain ones of the following methods for detection of atmospheric conditions of interest are primarily applicable to detecting the atmospheric conditions when the low beam headlights of the controlled vehicle are activated and the high beam headlights are deactivated. However, it should be understood that any of the methods may be employed with the high beam headlights activated. It is advantageous not to perform atmospheric condition level measurements when street lights or other non-vehicular lights are identified to be present since these lights may interfere with the atmospheric condition measurement. Atmospheric condition measurements can be temporarily suspended until these undesirable objects pass from the corresponding scene. It is advantageous to determine the parameters used to evaluate the images and the thresholds for atmospheric condition detection by evaluating the particular model of vehicle in which the system is installed to account for differences in beam pattern between different exterior light designs. It should be understood that a controlled vehicle may have headlights that allow variation in beam brightness, beam focus, horizontal aim, vertical aim, perceived color.

When oncoming vehicle headlights are present, detection of atmospheric conditions of interest is less certain because the headlights of the oncoming vehicles may "wash out" the images. The term "washing out" is used herein to describe a resulting image that is comprised of substantially all pixels that represent high levels of sensed light. Washing out of the image is generally of no concern, however, because detection of the oncoming vehicle headlights will cause the high beam headlights of the controlled vehicle to be automatically deactivated. Once oncoming vehicle headlights pass from the image measurement of atmospheric conditions may be performed prior to reactivating the high beams.

It is preferred to acquire high dynamic range images for use in the analysis to detect an atmospheric condition. By acquiring high dynamic range images both low and high levels of fog can be detected and the "sharpness" of the imaged reflections is most accurately determined. If the image sensor chosen natively acquires high dynamic range images then no special techniques are required to produce the adequate range. If the image sensor utilized does not possess sufficient native dynamic range, a high dynamic range image can be synthesized by acquiring multiple images of the same scene at multiple sensitivities in sequence and combining them to form a synthetic high dynamic range image. Such a technique is disclosed in detail in commonly assigned U.S. provisional patent application serial No. 60/404,879, the disclosure of which is incorporated in its entirety herein by reference. A high dynamic range image preferably possesses greater than 40 db dynamic range and most preferably greater than 60 db dynamic range. Images containing more than eight bits of dynamic range may be stored in memory logarithmically to reduce the memory requirements of the system.

Figure 5A:
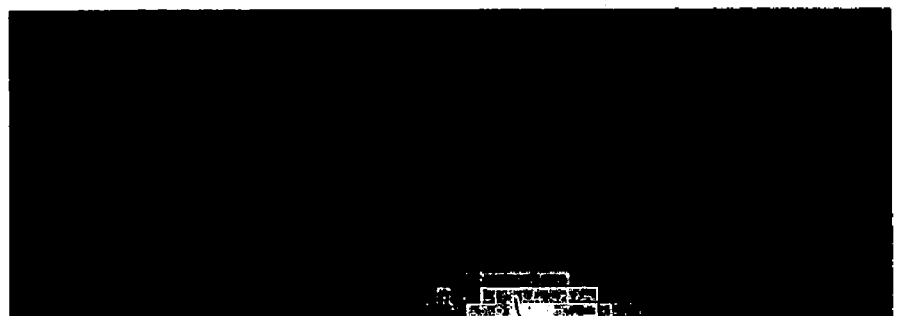
FIGS. 5a-5c depict various images generally forward of a controlled vehicle.
Figure 5B:
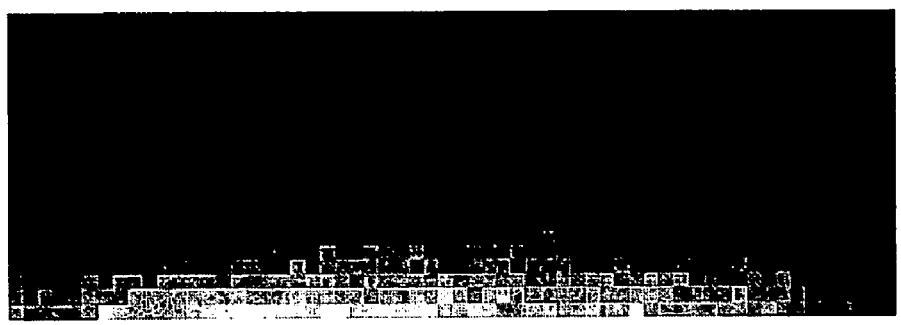
Figure 5C:
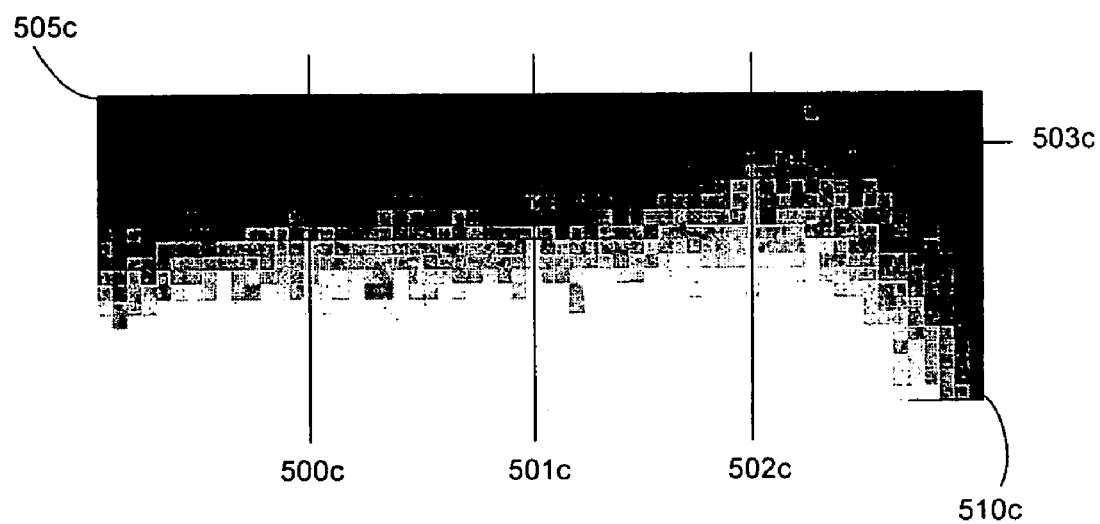

FIG. 5a shows an image acquired from an image sensor mounted in a controlled vehicle taken with a high sensitivity when none of the atmospheric conditions of interest are present and when no light sources from other objects or vehicles are present. At the bottom of the image is a relatively small bright region that depicts light rays reflected from the low beam headlights of the controlled vehicle off of the road surface. FIG. 5b shows an image acquired with similar parameters when a moderate level of fog is present. FIG. 5c shows an image acquired with similar parameters when a high level of fog is present. An equivalent series of images would have similar characteristics for atmospheric conditions of interest other than fog and the methods discussed herein for analyzing the images have equivalent application to all atmospheric conditions of interest. As can be appreciated from viewing the series of images depicted in FIGS. 5a-5c in light of FIG. 7, distinguishing reflections off of the road surface from the effects of atmospheric conditions of interest is difficult.

Figure 6A:
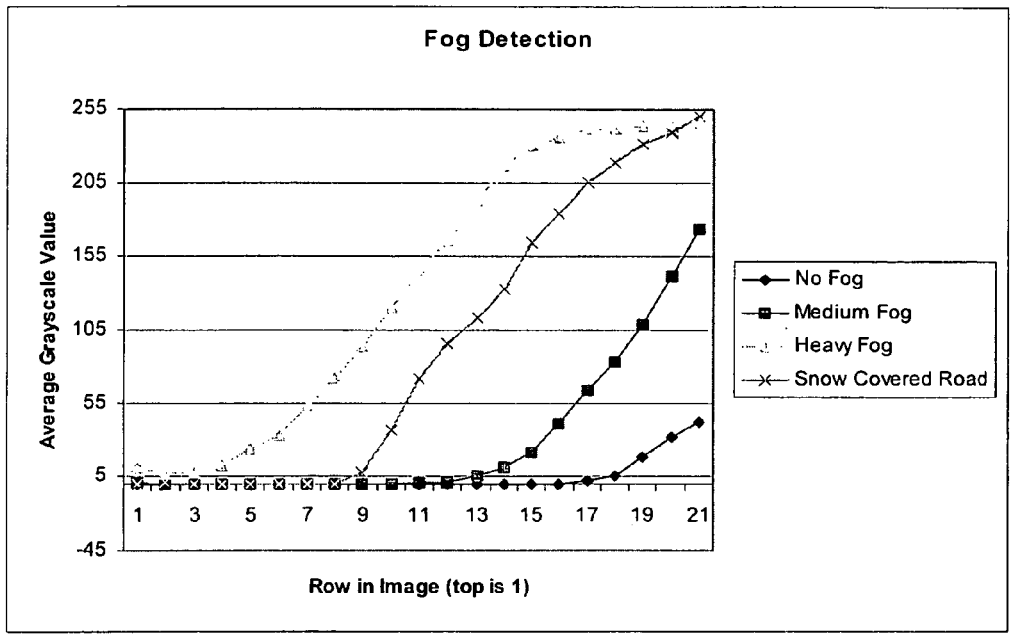
FIG. 6a depicts a graph of pixel grayscale values versus pixel row location.
Figure 6B:
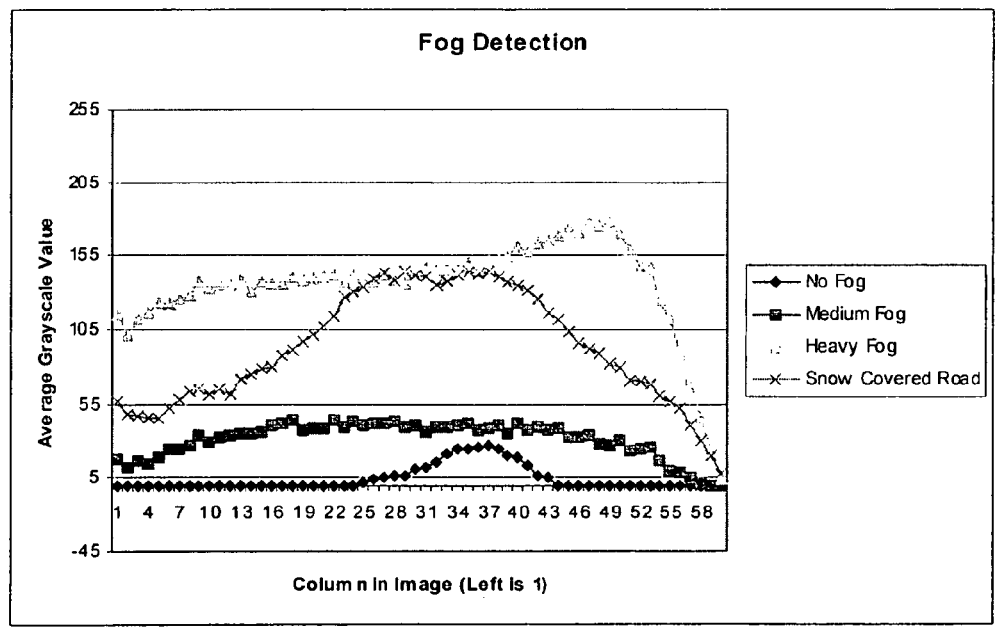
FIG. 6b depicts a graph of pixel grayscale values versus pixel column location.

FIG. 6a shows a vertical increase in reflections as the level of fog increases. Similarly, as shown in FIG. 6b, the horizontal extents of the reflection increases with increasing fog. This observation is particularly important in distinguishing reflections due to fog, or other atmospheric conditions of interest, from reflections off of the road surface. Reflections from the road surface are particularly difficult to distinguish from atmospheric condition reflections when the road surface is highly reflective due to being covered with water, snow, ice or a combination thereof. Roads covered with water, snow, ice, or a combination thereof are referred to herein as "highly reflective road surface(s)".

Figure 7:
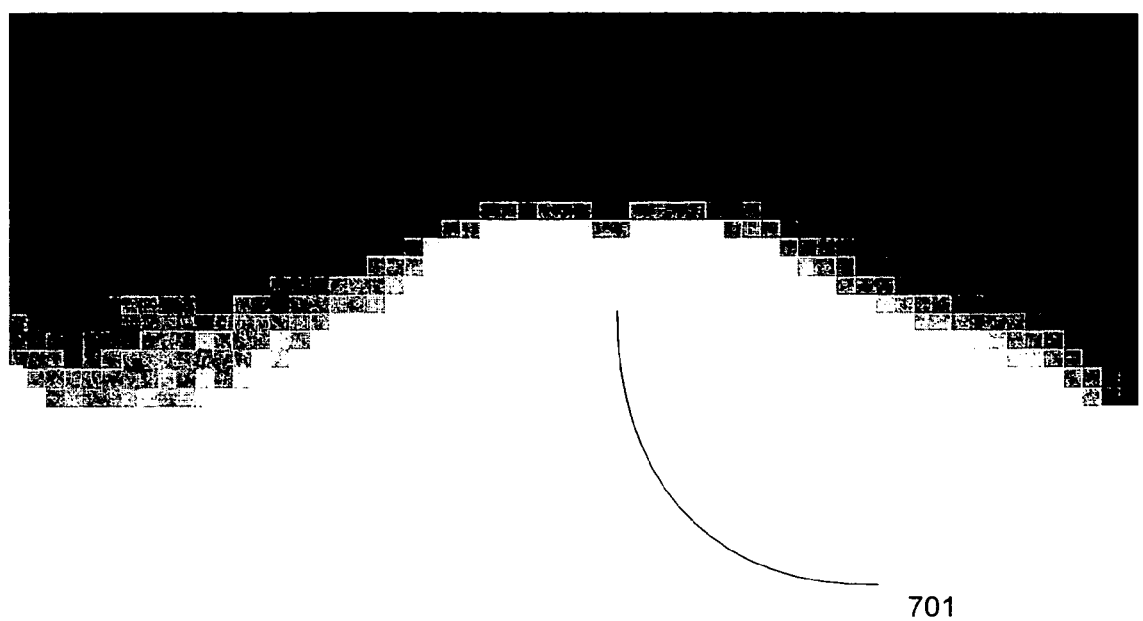
FIG. 7 depicts an image generally forward of a controlled vehicle.

Highly reflective road surfaces will cause a relatively high reflection of light rays of the exterior lights of the controlled vehicle as is shown in FIG. 7. As can be seen in FIG. 7, the width of the reflection 701, the horizontal extent, of light rays of the controlled vehicle is narrower than the reflection of light rays 501b due to an atmospheric condition of interest as shown in FIG. 5b. Therefore, by examining the width and height of the reflection within an image it is possible to improve determination of the presence of an atmospheric condition of interest.

Reflective road surfaces will typically appear "sharper" in the image than fog. A determination of the sharpness of the reflections imaged can be made by comparing the dc content of the image by computing the average grey scale value of the image or a sub-region of the image. Sharp objects in the image can be identified with an edge detection filter or by processing the image, or sub-region of the image, with a high pass filter, such as a Laplacian filter. The ratio of high-frequency content to dc content may be used to discriminate reflections of atmospheric condition of interest reflections from reflections off of the road or other objects.

In some situations a simple computation of the mean grey scale value, or total grey scale value, of substantially the entire image can be computed and compared to a threshold to detect an atmospheric condition of interest. If the mean grey scale value, or total grey scale value, exceeds a threshold, an appropriate action can be taken such as inhibiting automatic activation of the high beam headlights of the controlled vehicle. The mean gray scale value and total gray scale value measurements are particularly useful to inhibit automatic operation of the exterior light control system in very high level fog conditions, snow storms, and other atmospheric conditions of interest. This method is also useful when high beams are currently activated. A high mean or total grey scale value of the entire image may indicate that the driver has entered a region of heavy fog and thus dimming of high beam headlights would be advantageous.

Under other conditions, such as when only low beams are activated or when the level of fog is less, several parameters can be computed from row and column averages of pixels within the image sensor allowing a determination of the presence of an atmospheric condition of interest. Row and column averages are computed as the average grey values of all pixels in each row and each column. Row and column sums may also, or alternatively, be used. First, a simple computation of the mean grey scale value and, or total grey scale value, of substantially the entire image may be computed and compared to corresponding thresholds. If the mean grey scale value and, or total grey scale value, exceeds the threshold, an appropriate action can be taken such as inhibiting automatic activation of the high beam headlights of the controlled vehicle. The mean gray scale value and total gray scale value measurements are particularly useful to inhibit automatic operation of the exterior light control system in very high level fog conditions, snow storms, and other atmospheric conditions of interest.

For lesser levels of fog, or other lower level atmospheric conditions of interest, computation of the slope and, or intercept, of plots such as depicted in FIGS. 6a and 6b can be computed and compared to thresholds for determination of the presence of an atmospheric condition of interest. Preferably, these values are computed on the range of columns where the column averages are non-zero and, or non-saturated. Preferably, in addition to computing the slope and, or intercept, a "coefficient of determination" value:

$$\text{coefficient of determination} = R^2 = 1 - (SSE/SST) \qquad (1)$$

$$SST = \Sigma y_i^2 - [(\Sigma y_i)^2/n] \qquad (2)$$

$$SSE = \Sigma y_i^2 - \beta_0 \Sigma y_i - \beta_1 \Sigma x_i y_i \qquad (3)$$

is also, or alternatively, computed to determine if computation of the slope and, or intercept, are accurate. If the resulting coefficient of determination value is too low, the slope and, or intercept, methods should not be used, in and of themselves, to conclusively determine the presence of an atmospheric condition of interest.

As mentioned above and as depicted in FIG. 7, the row grey scale values of images of light rays reflected off highly reflective road surfaces, in certain situations, may be very similar to images of reflected light rays from atmospheric conditions of interest. Several additional options are available to distinguish reflected light rays off of atmospheric conditions of interest from reflected light rays off of highly reflective road surfaces.

First, the image can be broken down into multiple zones. For example, the row averages could be computed individually in a left zone, center zone, and right zone of the image. In an image of a scene containing reflected light rays from atmospheric conditions of interest, the vertical increase in brightness would be similar for the left and right zones with respect to the center zone. For an image of a scene containing reflected light rays from a highly reflective road surface, the center zone would exhibit a substantially higher vertical increase in reflection when compared to the right and left zones.

Secondly, the column grey scale values can be analyzed to determine if there is a fair amount of uniformity across the image or if there is significant non-uniformity. Uniformity can be computed by taking the standard deviation of the column averages as a percentage of the mean. Alternatively, a parabolic fit of the column averages can be used to determine if there is substantial falloff of the grey scale value on the edges. If the second order term in the fit has a high magnitude, there is high falloff at the edges as is shown in FIG. 6b. Again, a coefficient of determination value may be computed to determine if the fit is of acceptable quality before accepting the value of the measurement as determinative of the presents of an atmospheric condition of interest.

Finally, the high and low spatial frequency content of the image may be analyzed to distinguish road reflections from fog as discussed above. The high frequency content of the entire two dimensional image may be analyzed and the high frequency content in row and column sums may be looked at in one dimension individually.

The results of the above computational methods typically result is one or more parameters that can be evaluated to determine if an atmospheric condition of interest is present. Certain operational environment scenarios, other than atmospherically related, may produce measurements indicative of atmospheric conditions of interest. Examples of these operational environments include the presents of snow banks and driving on snow covered hills. To avoid false identification of atmospheric conditions of interest during these operational environment conditions, it is preferable to average the atmospheric condition measurements over several images and typically for several seconds.

For example, an image may be acquired and analyzed to detect atmospheric conditions of interest once a second. The parameters computed from this analysis may be averaged over 20 seconds and the result of this average compared to a threshold to determine if an atmospheric condition of interest is present.

On occasion, high levels of fog, or other atmospheric conditions of interest, may suddenly appear, such as when descending into a valley, which may require more rapid response. To accommodate these cases, an "extremely high" atmospheric condition measurement may be considered to induce immediate response. One method of accomplishing this is to employ an "absolute threshold" that is higher than the threshold for comparison with the computational average.

Hysteresis may be implemented to prevent toggling between exterior light states to further improve the automatic vehicle exterior light control system operation. In this case, a first threshold will be used to indicate the presence of an atmospheric condition of interest and a second threshold is used to indicate that the atmospheric condition has cleared. The second threshold is set such that there must be a lower level atmospheric condition of interest present after detection than the level required to indicate said atmospheric condition to be present. Hysteresis combined with use of time averaged atmospheric condition measurements provides stable and predictable automatic vehicle exterior light control. Alternatively, or in addition, a time or distance traveled delay may be added to prevent switching between states. For example, once an atmospheric condition of interest has been detected and automatic high beam control is disabled, a certain minimum length of time must elapse and, or, a threshold distance must be traveled before high beam control can resume. Similarly, a minimum amount of time and, or distance traveled, in which no atmospheric condition is detected may be required before control is resumed.

An additional method for detecting the presence of an atmospheric condition of interest involves the detection of the uniform diffuse reflection of light in the image. First, an image is acquired with sufficient sensitivity to detect the light from the controlled vehicle's headlights reflected by the atmospheric condition of interest. The acquired image may be the same image used for detection of vehicular light sources, may be a synthetic high-dynamic range image, or may be an image acquired specifically for the purpose of atmospheric condition detection. Multiple images of multiple exposures may also be taken and a synthesized image assembled. Sensitivity of the acquired image may be higher when high beam headlights are off since reflected light from high beam headlights is typically much brighter than from low beam headlights.

In order to determine if the light sensed by a pixel is from a uniform diffuse source, a low-pass filter is used to eliminate sharp or discontinuous features in the image from the measurement. This filter may be performed according to the formula:

$$LPF=abs(C-N)+abs(C-S)+abs(C-E)+abs(C-W)$$

Where LPF is the low-pass filter value, C refers to the greyscale value of the current pixel, N,S,E,W refer to the greyscale values of the neighboring pixels to the north, south, east, and west of the current pixel, and abs( ) refers to the absolute value function. Other filters using different weights for the neighboring pixels, or using different or a larger number of neighbors may be used. This function is performed on all pixels within the window which exceed a minimum brightness threshold. If the value of LPF falls below a threshold, indicating the pixel is part of a uniform diffuse region, an atmospheric condition level counter is incremented. This counter sums all the pixels within the image which have a brightness above a threshold and are determined, through the use of the low-pass filter, to be part of a uniform diffuse region.

The value of the atmospheric condition level counter represents an instantaneous measure of fog level. It is useful to average this value over a period of time, for example 15 seconds to 2 minutes and, or, a distance traveled to achieve less nuisance prone measurement. Reflections of a snow covered hill and, or, a snow bank may also indicate the presence of atmospheric conditions of interest. However, these objects typically pass quickly and thus are ignored by considering an average. It is also advantageous to perform fog measurement only when the vehicle is moving.

A sub-window within the image is selected for processing. This sub-window may be, for example, the region of pixels corresponding to 2 degrees above horizontal to 1 degree below horizontal when high beam headlights are on and 2 degrees above to 2 degrees below horizontal when high beam headlights are off. A higher low-end cutoff is used with high beam headlights because of the increased road reflections. The width of the image may be the full range used for vehicle light detection images which may, for example be approximately 12 degrees left to 12 degrees right. The selection of the image window may be adjusted according to inputs from vehicle pitch sensors or other calibration means.

Preferably, atmospheric condition of interest detection occurs only when the image is free of other light sources or contains only a limited number or limited brightness of light sources. If other vehicle lights are detected, high beam headlights will be deactivated anyway so this is generally of no consequence. Stationary lamps will pass from the image as the controlled vehicle travels, after which, fog detection can occur.

If the average atmospheric condition level exceeds a threshold, high beam headlights may be shut off or automatic activation of high beam headlights may be disabled. In some cases, an atmospheric condition that can be detected with high beam headlights on may not be detectable with high beam headlights off. In this case, automatic high beam headlight activation may be suspended for a predetermined time, predetermined distance, until the driver re-activates control through a switch, until the controlled vehicle stops, or until the controlled vehicle has been shut-off and restarted. If the atmospheric condition is detectible by low beam headlights, high beam control may be re-initiated once the atmospheric condition level has fallen below a threshold level. Hysteresis may be provided between the disable and re-enable thresholds.

Algorithms for detecting atmospheric conditions of interest when high beam headlights are partially, or fully, activated will preferably incorporate different variables and, or, multiplication factors than algorithms associated with low beam operation. When high beam headlights are activated, the reflection of the light rays off of the atmospheric condition does not exhibit gradual vertical cutoff as represented by the slopes of the plots in FIGS. 6a and 6b. Instead, the reflection from the atmospheric condition from high beam headlights tends to fill substantially the entire image corresponding to the given field of view. However, due to the significantly higher on-axis intensity of the high beam headlights, the amount of light reflected on axis is much higher in images having a relatively short exposure time. Because of the significantly higher on axis intensity, the image acquisition sensitivity may be chosen to be a lower value than the sensitivity used to detect atmospheric conditions with high beam headlights off. Alternatively, images acquired to detect oncoming vehicle headlights, or leading vehicle taillights, may be of appropriate sensitivity to detect atmospheric conditions with the high beam headlights of the controlled vehicle activated.

Detection of atmospheric conditions of interest when the high beam headlights of the controlled vehicle are on may be accomplished with a calculation of the mean grey scale value, or total grey scale value, of the image as discussed above with regard to low beam headlight operation if the associated image is acquired with a lower sensitivity or sensitivities in case of a synthetic high dynamic range image.

Another method of detecting atmospheric conditions of interest is particularly well suited to having the high beam headlights of the controlled vehicle activated. However, it should be understood that this method may be used when only the low beam headlights are activated. First, a very high sensitivity image and a low sensitivity image are acquired. The low sensitivity image is preferably acquired when few, if any, light sources are present in the associated scene. Preferably no light sources are present when taking the low sensitivity image. It is also preferable that the controlled vehicle speed is greater than a given threshold, acceleration is less than a second threshold and deceleration is less than a third threshold when taking a low sensitivity image. Braking causes the controlled vehicle to dip such that the image sensor is looking more at the road surface immediately in front of the vehicle and at the same time the high beam headlights direct more light toward the road surface. Therefore, the images for this analysis are preferably acquired when not braking or decelerating. Next, the average grey scale value for each row in the very high sensitivity image is calculated. The row average grey scale value will have a net increase when moving down in the image if an atmospheric condition of interest is present. The net increase in row average grey scale value from the top of the image to the bottom is measured and is compared to a threshold. The row averages will be highest by the bottom of the image. Lights that are only in the top half of the image will be rejected. If there is a light source at the top and a reflection at the bottom, the image will be accepted as indicative of an atmospheric condition of interest. Preferably a second very high sensitivity image and a second low sensitivity images are acquired that are red spectrally filtered. The white to red ratio of substantially the entire image is computed and used to indicate the presence of an atmospheric condition of interest. The white-to-red ratio may be used in addition to, or in lieu of, the row averages.

For a constant high beam level the light reflected from fog will vary depending on the thickness of the fog. For a short frame of time, assuming a constant thickness of fog and constant high beam output the brightness should be approximately constant. The variation in brightness of light is an indication that fog is not present.

Additionally, the sum of at least a portion of the average grey scale values for each row of each image may be computed. If the sum of the average grey scale values for each row is greater than a high percentage of substantially the entire image when saturated, it is an indication that an atmospheric condition of interest is present, Alternatively, if the sum of the average grey scale values for each row is a lower value and the white-to-red ratio is above a threshold, the image may be indicative of the presence of an atmospheric condition of interest.

Reflections from some atmospheric conditions of interest, especially fog, have significantly less red content when compared to reflections from highly reflective road surfaces. Preferably, a combination of the above measurements are met for a minimum time and, or driving distance, prior to determining that an atmospheric condition of interest is present.

It is possible that an atmospheric condition of interest is present but the low beam atmospheric level measurements described above fail to detect a sufficient value to give a positive indication. However, once the high beam headlights of the controlled vehicle are activated, the atmospheric condition level detected is more significant. One way to overcome this problem is to monitor the atmospheric condition level while the headlights of the controlled vehicle are increased in brightness. If there is an increase in the detected atmospheric condition level measurements, corresponding to the increase in brightness in the headlights, a positive indication of the presents of an atmospheric condition may be deduced and automatic high beam control may be suspended.

In order to identify the characteristics as discussed above with regard to FIGS. 6a and 6b, the row and column sums for each row and column of the image may be supplied as input variables to a probability function and, or, a neural network. Additional input variables and, or, multiplication factors such as those described elsewhere herein, may be incorporated. For example, a neural network may be "trained" with row and, or column, sum data for images containing reflected light rays from atmospheric conditions of interest and images of a variety of other scenes which do not contain atmospheric conditions. Specifically, scenes such as snow covered, or otherwise highly reflective roads, which are easily mistaken for the presence of atmospheric conditions of interest, should be included in the training data. The neural network may then be configured to identify situations such as those depicted in FIGS. 5a, 5b, 5c and 7 to provide an output indicative of the presence of an atmospheric condition of interest. Separate neural networks may be used for the high beam headlight off and high beam headlight on state and, or the state of the exterior lights of the controlled vehicle may be provided as an additional input to the neural network. The complexity and number of inputs required for a neural network may be reduced by combining neighboring rows and columns into a signal output, effectively reducing the resolution of the detection method. This may be especially useful when a high resolution image sensor is utilized. If plenty of processing power is available, entire raw images may be used to train the neural network. Alternatively, the neural network may be trained by forming reduced resolution images rather than using row and column sum data. Reduced resolution images may be formed by averaging several pixels in a neighborhood into one "pixel", thus reducing the number of pixels buy a factor the size of the neighborhood chosen.

Once an atmospheric condition of interest is identified with the high beam headlights of the controlled vehicle activated, the high beam headlights may be gradually reduced in intensity and automatic control inhibited until the atmospheric condition has cleared. Additionally, a low beam atmospheric condition level measurement may be acquired immediately after the high beams of the controlled vehicle have been disabled and used as a baseline (i.e. a measurement below which the low beam atmospheric condition level measurements must fall before automatic high beam control is reactivated).

In addition to the above methods utilizing an image sensor to detect reflections from an atmospheric condition of interest, reflections may be detected using a separate discrete photosensor or a non-imaging photodetector, such as a photodiode, photoresistor, photogate, a sensor as described in commonly assigned U.S. Pat. Nos. 5,990,469; 6,008,486; 6,130,421; 6,130,448; 6,049,171; and 6,403,942; the disclosures of which are incorporated herein in their entireties by reference, or any commonly available photo transducer based sensor. With use of a discrete photo sensor, rise in ambient light caused by an atmospheric condition of interest may be used as determinative of the presents of an atmospheric condition of interest. A discrete photosensor may be particularly useful in determining a rise in forward ambient light corresponding to the increase in brightness when the high beam headlights of the controlled vehicle are activated, thus, at least in part, indicating the presents of an atmospheric condition of interest. The use of a discrete photosensor has the advantage of a significantly faster and simpler reading of light levels and a significant reduction in processing time required to analyze the acquired data.

A supplemental light source, such as for example a high-brightness LED, may be used to further aid in the detection of an atmospheric condition of interest. The supplemental light source may be packaged either within the imaging assembly or in another location on the vehicle, such as within the headlamp assembly. The supplemental light source is preferably aimed such that light reflected from the source off of the atmospheric condition of interest is detectable by the image and, or, photosensor. Preferably, the light source is a non-visible light source such as an infra-red light source which is detectable by the sensor.

An infra-red cutoff filter may be used with an image sensor which would substantially attenuate much of the light from the infrared light source. In this case, a separate discrete light sensor (or even a separate image sensor without full IR filtration) may be used to detect the reflections of the light source. In this case, the discrete photosensor is preferably designed to have approximately the same viewing angle as the emission angle of the light source. Most preferably a discrete photosensor is filtered to allow only the light spectral band emitted by the supplemental light source to be detected. The discrete photosensor may be the ambient forward-looking light sensor of an electrochromic mirror. Yet another alternative to a discrete light sensor is to provide a narrow notch band pass in an image sensor's infra-red filter to allow the specific wavelength of the supplemental light source to pass.

Detection of an atmospheric condition of interest using a supplemental light source preferably proceeds by acquiring two images, one with the light source activated and one without the light source deactivated. If an atmospheric condition is present, the reflection of the light source will be imaged in the image acquired with the light source active. The difference in average grey scale value of the two images may be used as a measure of the quantity of an atmospheric condition of interest.

If a discrete photosensor is used, two light level measurements may be taken, one with the supplemental light source active and one without. The difference between the two measurements is indicative of the level of the atmospheric condition of interest.

Additionally, the task of detecting atmospheric conditions of interest may be performed by other means or by using non-optical sensors, such as temperature or humidity sensors, capable of detecting atmospheric conditions. Combinations of optical and non-optical techniques may also be advantageous.

EXAMPLE

Atmospheric Condition of Interest Detection

As an example embodiment of the present invention, five factors may be combined to provide an indication of an atmospheric condition of interest.

First, the raw number of light sources detected in an image may be a factor. This factor may be a number ranging between 0 and 7 for example. As the atmospheric condition of interest becomes more prevalent in an image, any light sources present will tend to blur together. It may be the case that no light sources, or only a couple, are present. However, if there are closer to 7 than 0 light sources present, it is less likely that an atmospheric condition of interest is present. The likelihood of an atmospheric condition of interest being present may be a linear relationship with respect to the number of light sources in the image or a threshold number of light sources may trigger a Boolean indication for this factor.

Second, a factor indicative of an atmospheric condition of interest may be included that examines a left 500c, middle 501c and right 502c column of pixels in the image generally as depicted in FIG. 5c. Preferably, the middle column is determined with relation to an auto-aiming feature of the corresponding image; the left column is preferably approximately fifteen columns left of the middle column and the right column is approximately fifteen columns right of the middle column. The individual pixel light levels is then calculated moving down the individual columns preferably begin at row 4 503c. As can be seen from FIG. 5c, the upper-left of the image 505c is designated to be row zero, column zero and the lower-right of the image 510c is designated to be row twenty, column 59. It should be understood that other sized images may be employed and that other columns and, or rows, of pixels may be considered. Once a given row is determined to be indicative of an atmospheric condition of interest, an increasing reflected light level as moving downward in the image is confirmation. Additionally, the results for the left, middle and right columns may be compared to one another for confirmation. The middle start row compared to the left and right being higher in the image may be confirmation. An index, preferably ranging from −10 to 30 may be employed and incremented or decremented in relation to these factors to arrive at a final indication of an atmospheric condition of interest as indicated by this second factor.

Third, a center portion of a row near the bottom of a clear image, preferably row 19 columns 17-49, is examined for differences in light levels in adjacent pixels. If the absolute difference is greater than 8, using a logarithmic array value, a count is incremented in an associated counter that ranges between approximately −30 and approximately 5. If this counter is greater than or equal to 2, ten is subtracted from a likelihood of fog index that ranges from approximately 0 to approximately 100. If this counter is less than 2, one is added to the likelihood of fog index. If there is an atmospheric condition of interest present, the road markings will not be visible. If there are intermittent markings present in the image, like stripes in the middle of the lane, the likelihood of fog index is quickly decreased. If no markings are present in the image, the fog index is slightly increased. This allows for gaps in road markings and reduces large variations due to intermittent road markings. It should be understood that a linear pixel value array may be employed as well.

Forth, a number of pixels that indicate an atmospheric condition of interest is determined by examining a number of rows of pixels near the center of the image. Each pixel is analyzed for uniformity with its four neighboring pixels. If a pixel is determined to be uniform with its neighbors, a counter ranging from approximately 0 to approximately 100 is incremented. This counter is then added to the fog index as a factor in determining the presence of an atmospheric condition of interest.

Fifth, a white-to-red ratio is calculated for pixels in a rectangular areas of a red spectral filtered image and another image representative of substantially the same field of view. This area of the images is where reflections from atmospheric conditions of interest as well as reflections from the road will be most prevalent. The average light for each rectangle is calculated using a linear pixel value data array. A white-to-red ratio is determined by multiplying the average clear image related value by ten and dividing this number by the average red image related value. The corresponding white-to-red ratios are more constant over a series of images with reflections from atmospheric conditions of interest as compared with reflections from a road surface.

A likelihood of an atmospheric condition of interest may then be computed using a probability function with any of the factors described herein taken in combination with corresponding weighting factors. For example:

$P$(atmospheric condition of interest)=$A$*(raw number of lights)+$B$*(Left/Middle/Right Column indication)+$C$*(Stripe detect)+$D$*(number of pixels indicative of condition)+$E$*(white-to-red ratio)

When an atmospheric condition of interest is detected, the high beam headlights are dimmed. Upon dimming, several rectangular areas of the corresponding image may be recorded. These areas will then be used to determine when the high beam headlights should be automatically turned on. The average value of all the rectangles serves as a pattern recognition template and those values are subtracted from subsequent readings to determine is the atmospheric condition of interest remains. A value closer to 0 when the difference for each rectangle is summed is indicative of a closer match. This can be stored in a corresponding memory and used to account for the specific controlled vehicle lighting and imager configuration.

In addition to performing the task of inhibiting automatic high beam activation in atmospheric conditions of interest, the above methods may be used to perform other functions such as the activation of front and, or rear, fog lamps. The above methods can be used in conjunction with controlling motorway lighting, wherein the vertical angle of the exterior light beams are varied, and bending lighting, wherein the horizontal angle of the exterior light beams is varied, by adjusting the appropriate thresholds accordingly. Additionally, the associated automatic vehicle exterior light control system may be configured to generate at least one, or more, signal(s) selected from the group consisting of; an exterior light adjustment rate signal, an image analysis signal, a system sensitivity signal, an algorithm parameter signal, an algorithm activation signal, an algorithm inhibit signal, an image array window signal, an operator indicator signal, a fowl weather light brightness signal, a taillight brightness signal, a field of view signal, a variable spectral filter signal, a variable focal length signal, a variable aperture signal, an exterior light transition delay signal, an exterior light maximum brightness signal, and an exterior light minimum brightness signal.

In another embodiment, the automatic vehicle exterior light control system is adapted to detect blockage of the image sensor. When the image sensor is positioned such that the view of the forward scene is through a region of the windshield that is cleaned by the windshield wipers, blockage of the image sensor may be rare. However, a localized contamination may occur that is not easily removed by windshield wipers such as stubborn dirt, ice or other contamination that is not easily removed. If such contamination does not block the drivers view through the windshield, the driver may not be motivated to activate the wipers or otherwise act to clean the windshield in the region in front of the image sensor. Additionally, since blockage of the image sensor is likely a rare event, the driver may not be aware of blockage of the image sensor and may suspect that the automatic vehicle exterior light control system is faulty rather than just obstructed. It may also be advantageous to check for a blocked imager immediately after the vehicle is started or at some time interval.

Following are several methods for detecting a blocked image sensor. Any one, or a combination, of these methods may be used to determine if the image sensor is blocked. Typically several blockage measurements are preformed before concluding with certainty that the image sensor is blocked. Once image sensor blockage is determined, the image sensor may continue to acquire images until objects are once again detected in the images at which point automatic control may be resumed. If several images have been acquired over a period of time, preferably a very long period of time, and no light sources are detected in any images, it is possible that the image sensor is blocked. To confirm that the image sensor is blocked, any of the following techniques may be employed.

Figure 8:
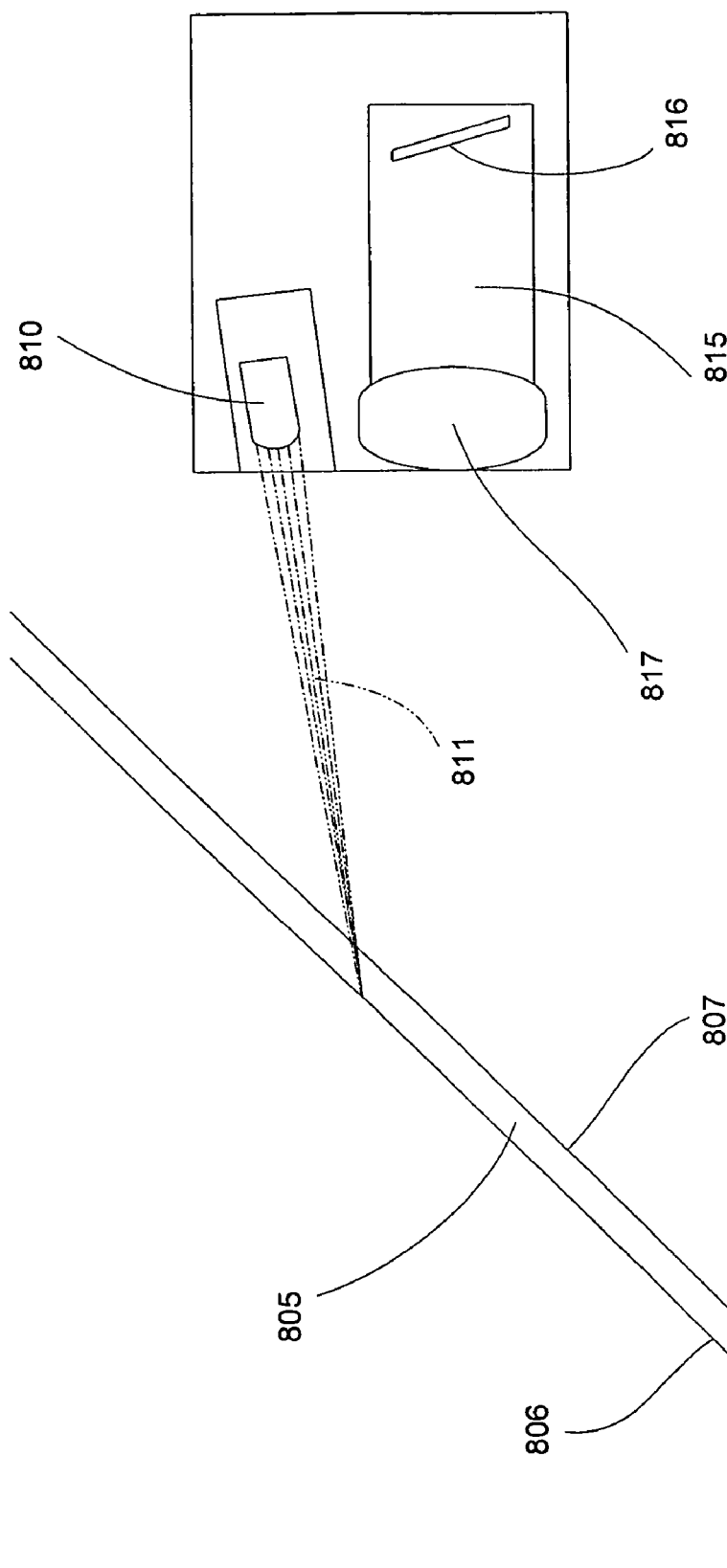
FIG. 8 depicts an imager assembly.

Another image sensor blockage detection method is now described with reference to FIG. 8. As shown, at least one embodiment has an imager assembly 815 having an image sensor 816 and associated optics 817 generally aimed toward a windshield 806 of a controlled vehicle. Preferably, the light rays 811 emitted from a supplemental light source 810 intersect with the surfaces 806, 807 of windshield 805 within the field of view of the image assembly 815. Image sensor based systems are disclosed in commonly assigned U.S. Pat. Nos. 5,923,027, 6,617,564 and U.S. patent application Ser. No. 09/970,728; the disclosures of which are incorporated in their entireties herein by reference. The LED may project a spot of light most preferably covering the entire area through which the image sensor views, although a smaller or larger spot may also be sufficient. The light source should emit light at a wavelength, or wavelength range, to which the image sensor is sensitive. If no ice, windshield fog or other contamination is present, light from the LED will pass through the windshield and will not be visible to the image sensor. If ice, windshield fog or other contamination is present, light from the LED will be reflected, at least partially, in a Lambertian fashion and can be detected in an image acquired by the image sensor. The ice, windshield fog or other contamination acts like a movie screen, resulting in the image sensor detecting the reflected light rays. To detect the Lambertian reflected light, an image is acquired when the LED is energized. Most preferably two images are taken, one with the LED energized and one without and their difference is used to detect reflected light. If the difference between the two images is large, a significant amount of the LED light rays have been determined to have been reflected and it is determined that the image sensor is blocked.

The current method of detecting a blocked camera has similarities to the previously disclosed method of detecting an atmospheric condition through the use of a supplemental light source. In both cases a light source is energized in order to detect a reflection off of a substance in front of the image sensor or discrete light sensor. In the current case, this substance is a near-field contamination or blockage on the windshield and in the prior case this substance is an atmospheric condition in front of the vehicle. Both functions may be performed with common components. It may be desirable to operate the light source at a lower power, or alternatively to operate the image sensor or discrete light sensor at a lower sensitivity, when sensing a near-field blockage since the near field reflection will likely be much higher. Discrimination between near-field blockage and atmospheric conditions may be made based upon the intensity of the reflection. However, when disabling automatic exterior light control is the desired action upon detection of either blockage or an atmospheric condition discrimination between the two situations is unnecessary.

Another method to detect a blocked image sensor utilizes an auxiliary sensor located apart from the image sensor to detect conditions in which the image sensor is blocked. The auxiliary sensor may be a single non-imaging light sensor viewing approximately the same direction as the image sensor and having a viewing angle similar to that of the image sensor. Ideally, the auxiliary sensor is located a distance of at least a few inches from the image sensor. The forward ambient sensor of an electrochromic rearview mirror may be used as the auxiliary sensor. If the forward ambient sensor has a field of view substantially different from the imaging system, a separate forward sensor with a more similar field of view may be mounted in the mirror as the auxiliary sensor. To determine if there is blockage of the image sensor, a light level is obtained by the auxiliary sensor. If a significant amount of light is measured by the auxiliary sensor, some type of light source should be detectable by the image sensor. An image is acquired at a sensitivity such that ambient light of the level detected by the auxiliary sensor would be detectable in the image. If no light is detectable in the image it is likely that the image sensor is blocked. This method may be particularly useful in the presence of oncoming vehicle headlamps. If headlamps are approaching, the auxiliary sensor will detect an increase in light level followed by a sudden drop in light level when the vehicle passes. If headlamps are not detected in the image acquired from the image sensor under this condition, the image sensor is likely blocked.

Yet another method of detecting a blocked image sensor involves the acquisition of an image such as shown in FIG. 5a. In FIG. 5a, the reflection of low beam headlights of the controlled vehicle off of the road surface is seen in the image. If the reflection of the low beam headlights, or other exterior light, of the controlled vehicle off of the road surface cannot be seen when the low beam headlights, or other exterior light, of the controlled vehicle are known to be activated, the image sensor is likely blocked. Before concluding that the image sensor is blocked, several images should be acquired over a period of time. Bumps in the road or hills may cause the reflection of low beams to become more or less visible, thus impacting the ability to detect a blocked image sensor. If axel sensors are present on a vehicle, such as with automatic headlamp leveling systems, the output of these sensors may be used to establish the appropriate time to acquire an image to detect the reflection of the low beam headlights off of the road.

Upon detection of a blockage the above invention could be used to activate a cleaning or contamination removal system such a wiper, washer, defroster, heater or combination thereof designed to remove contamination from a surface in the path of the view of the image sensor. This may be especially important for image sensors viewing through surfaces other than the windshield where the wiper system removes contamination. Finally, a warning light or message may be automatically displayed to the driver of the controlled vehicle indicating that automatic exterior light control is disabled or cleaning of the windshield is advised.

An appropriate blockage indicator may be audible, visual or a combination of audio and visual. The visual indicator may be an LED, a vacuum florescent display, a liquid crystal display, a LED/indicia, a back lit liquid crystal display and may be incorporated into the instrument cluster, the rearview mirror, the overhead console, message center or any other location visible to the driver of the controlled vehicle. The audio indicator may be incorporated in any suitable device within the controlled vehicle. A diagnostic message may be provided which can be read at a service station.

In addition to inhibiting automatic control of high beam headlights of the controlled vehicle the above methods may be used to ensure failsafe operation of other vision systems. For example, electronic vision systems may be used to detect obstacles, provide a lane change warning, provide adaptive cruise control, provide a supplemental rear vision system, a rear vision system, a moisture sensor system and many other features. All of these and many other features would not function properly if there were fog, rain or snow or if there was a blockage in front of the image sensor. The above described invention can be used to detect these conditions and cause the feature to revert to a failsafe condition or warn the driver, through a visible or audible warning that the feature was inoperable so the driver does not depend upon the vision system to perform a task.

Another situation in which automatic high beam control may not be desired is when driving in a town. In fact, some European countries prohibit high beam headlight use in towns.

When driving below a certain speed, for example 50 km/hour, automatic high beam headlight activation may be suspended. Alternatively, a GPS or other navigation system may be used to identify the geographical location of the controlled vehicle and disable automatic control when the vehicle is located in a town. Since towns are typically lit with municipal lighting, high beam activation may be disabled when the ambient light exceeds a threshold or by the combination of low speed and high ambient lighting threshold. Finally, the ability to detect AC streetlamps, described in commonly assigned U.S. Pat. No. 5,837,994, which is incorporated herein in its entirety by reference, enables the computation of the density of streetlamps. The number of streetlamps per distance traveled may also be computed and used as a determination of town conditions. If the number of streetlamps detected in a given time or distance exceeds a threshold, automatic high beam headlight activation is inhibited. Additionally, town lighting can be activated when the controlled vehicle is determined to be operating within a town.

Yet another situation in which automatic high beam activation may not be desired is when pedestrians or cyclists are present. Pedestrians or cyclists are likely to be disrupted or annoyed by high beam headlight glare from an oncoming controlled vehicle. One of the most significant potential safety benefits of high beam headlights is the improved visibility distance and the ability to detect pedestrians at a greater distance. Automatically dimming of high beam headlights in response to pedestrians or cyclists may negate the safety benefits of high beam headlights if dimming occurs before the driver of the controlled vehicle has a chance to see the pedestrian or cyclist. However, once a driver has identified the pedestrian or cyclist and their location has been determined, high beam headlights may be dimmed as a courtesy. To facilitate this, a switch may be provided for the driver, or an occupant, of the controlled vehicle to actuate that dims the high beam headlights and, at least temporarily, suspends automatic high beam headlight activation until the controlled vehicle has passed the pedestrian, or cyclist, or until a given time period has elapsed.

It should be understood that any given automatic vehicle exterior light control system in accordance with the present invention may be adapted to employ the ambient light algorithms, the atmospheric condition detection algorithms, the image sensor blockage algorithms, the town operation detection algorithms, and the pedestrian or cyclist detection algorithms in conjunction with any of the methods or system responses discussed herein. Additionally, it should be understood that any one of the algorithms or methods described herein may be employed standing alone. There are a number of variables that influence the particular embodiments and actual implementation of each algorithm or method.

What is claimed is:

1. An automatic vehicle exterior light control system comprising:
    a processor configured to effect automatic operation of the light control system as a function of an ambient light value, wherein said ambient light value is a weighted average of a plurality of ambient light level readings acquired from a photo transducer;
    a controller configured to generate an exterior light control signal if the light control system is operational as a function of the presence of an atmospheric condition of interest, wherein said controller is further configured to distinguish between reflections off of a highly reflective surface and reflections off of atmospheric conditions of interest based on input from at least one imager; and wherein an exterior light control output of said controller is in a first state when reflections off of a highly reflective surface are detected and said exterior light control output is in a second state when reflections off of atmospheric conditions of interest are detected.

2. An automatic vehicle exterior light control system as in claim 1 wherein said highly reflective surface is selected from the group comprising: an at least partially wet road, an at least partially snow covered road, an at least partially ice covered road, a surface of a snow pile along a road, and a surface of an at least partially snow covered road side.

3. An automatic vehicle exterior light control system as in claim 1 wherein said atmospheric condition of interest is selected from the group comprising: fog, mist, snow, sleet, hail, rain, steam, smoke and dust.

4. An automatic vehicle exterior light control system as in claim 3 wherein said highly reflective surface is selected from the group comprising: an at least partially wet road, an at least partially snow covered road, an at least partially ice covered road, a surface of a snow pile along a road, and a surface of an at least partially snow covered road side.

5. An automatic vehicle exterior light control system as in claim 1 wherein said reflections are identified by employing at least one of the parameters selected from the group comprising: mean grayscale value of at least a portion of at least one image, total grayscale value of at least a portion of at least one image, average grayscale value of at least a portion of at least one image, slope of pixel column location versus pixel grayscale value of at least a portion of a column of pixels within at least one image, slope of pixel row location versus pixel grayscale value of at least a portion of a column of pixels within at least one image, intercept of pixel column location versus pixel grayscale value of at least a portion of a column of pixels within at least one image, slope of pixel row location versus pixel grayscale value of at least a portion of a column of pixels within at least one image, a coefficient of determination, parabolic fit of at least a portion of column pixel value averages in at least one image, multiple images of differing exposure times, inputs from vehicle pitch sensors, a low-pass filter applied to at least a portion of an image, gradual vertical cutoff in at least a portion of pixel rows within at least one image, row average grayscale value net increase moving downward in at least one image, white-to-red ratio of at least one pixel in at least one white image and at least one pixel in at least one red spectral filtered image, sum of average grayscale values for at least one row in at least one image, increase brightness of controlled vehicle's exterior light and detect increase in reflection, at least one probability function, and at least one neural network.

6. An automatic vehicle exterior light control system as in claim 1 wherein said controller is further configured to manipulate one of the items selected from the group comprising: an exterior light adjustment rate, an image analysis parameter, a sensitivity parameter, fog light signal, taillight brightness, a field of view parameter, a spectral filter parameter, an algorithm parameter, an algorithm activation, an algorithm deactivation, an exterior light maximum brightness limit, and an exterior light minimum brightness limit as a function of detected reflections.

7. An automatic vehicle exterior light control system as in claim 1, wherein said weighted average is of a most recent approximately 16 photo sensor readings with approximately 100 ms intervals.

8. An automatic vehicle exterior light control system as in claim 1, wherein said weighted average is an exponential time weighted average of a most recent approximately 256 photo sensor readings with 100 ms intervals.

9. An automatic vehicle exterior light control system as in claim 1, wherein said photo transducer is a high dynamic range imager, such that high dynamic range images are acquired to detect an atmospheric condition.

10. An automatic vehicle exterior light control system as in claim 9, wherein said high dynamic range image is a synthetic high dynamic range image.

11. An automatic vehicle exterior light control system as in claim 1 wherein said weighted average is calculated using an ambient short average value of the most recent ambient sensor readings taken over a period less than two seconds.

12. An automatic vehicle exterior light control system as in claim 1 wherein said ambient short average is used in determining a transition from a day lighting condition to a night lighting condition.

13. An automatic vehicle exterior light control system as in claim 1 wherein said weighted average is calculated using an ambient long average value of the ambient sensor readings taken over a period less than 30 seconds.

14. An automatic vehicle exterior light control system as in claim 1 wherein said ambient long average value is used in the transition from a night lighting condition to a day lighting condition.

15. An automatic vehicle exterior light control system, comprising:

a processor configured to effect automatic operation of the light control system as a function of an ambient light value, wherein said ambient light value is a weighted average of a plurality of ambient light level readings acquired from a photo transducer;

a controller configured to identify the source of a reflection in an image if the light control system is operational by employing at least one of the parameters selected from the group comprising: mean grayscale value of at least a portion of at least one image, total grayscale value of at least a portion of at least one image, average grayscale value of at least a portion of at least one image, slope of pixel column location versus pixel grayscale value of at least a portion of a column of pixels within at least one image, slope of pixel row location versus pixel grayscale value of at least a portion of a column of pixels within at least one image, intercept of pixel column location versus pixel grayscale value of at least a portion of a column of pixels within at least one image, slope of pixel row location versus pixel grayscale value of at least a portion of a column of pixels within at least one image, a coefficient of determination, parabolic fit of at least a portion of column pixel value averages in at least one image, multiple images of differing exposure times, inputs from vehicle pitch sensors, a low-pass filter applied to at least a portion of an image, gradual vertical cutoff in at least a portion of pixel rows within at least one image, row average grayscale value net increase moving downward in at least one image, white-to-red ratio of at least one pixel in at least one white image and at least one pixel in at least one red spectral filtered image, sum of average grayscale values for at least one row in at least one image, increase brightness of controlled vehicle's exterior light and detect increase in reflection, at least one probability function, and at least one neural network; and wherein a state of an exterior light control output of said controller is at least partially dependent upon the source of said reflection in said image.

16. An automatic vehicle exterior light control system as in claim 15 wherein said controller is further configured to manipulate one of the items selected from the group comprising: an exterior light adjustment rate, an image analysis parameter, a sensitivity parameter, fog light signal, taillight brightness, a field of view parameter, a spectral filter parameter, an algorithm parameter, an algorithm activation, an algorithm deactivation, an exterior light maximum brightness limit, and an exterior light minimum brightness limit as a function of detected reflections.

17. An automatic vehicle exterior light control system, comprising:

a processor configured to effect automatic operation the automatic vehicle exterior light control system as a function of an ambient light value if the light control system is operational, wherein said ambient light value is a weighted average of a plurality of ambient light level readings acquired from a photo transducer, said controller is further configured to detect at least one of a pedestrian and a bicyclist and further configured to provide a corresponding indication to an operator of a controlled vehicle;

wherein a state of an exterior light control output of said controller is at least partially dependent upon detection of either a pedestrian or a bicyclist based on input from at least one imager.

18. An automatic vehicle exterior light control system as in claim 17 further configured to disable automatic operation of at least one high beam headlight in response to an operator activated input device.

* * * * *